Patented June 15, 1954

2,681,167

UNITED STATES PATENT OFFICE 2,681,167

METHOD OF GAS STORAGE

Paul B. Weisz, Pitman, N. J., assignor to Socony-Vacuum Oil Company, Incorporated, a corporation of New York No Drawing. Application November 28, 1950,
Serial No. 198,019

5 Claims. (Cl. 222—1)

This invention relates to a system for effecting the storage, at substantially atmospheric pressure, of a gas volume considerably greater than the volume of the containing vessel. More particularly, the present invention is concerned with an economical, convenient method for storing and discharging gases characterized by substantial insolubility in water.

The high affinity of inorganic oxide gels for various fluids has long been recognized and this characteristic has, in fact, led to one of the principal uses of such gels, namely, as adsorbents. In a highly porous gel structure, the quantity of gas capable of being adsorbed may correspond to a gaseous volume many times the volume of the adsorbent. The amount of gas which may be adsorbed under a given set of conditions is quantitatively denoted by the adsorption isotherm.

Methods heretofore employed for storing gases have generally involved pumping the gas under high pressure into a suitable storage vessel. Thus, it has heretofore been customary in filling gas storage tanks to utilize pressures as high as 2500 pounds per square inch. The development of such pressures requires need of particularly constructed storage vessels and necessitates the use of high compression pumping equipment and further requires certain operational precautions due to the relatively high pressure created in the pumping lines. Moreover, the release of gas from such storage vessels necessarily involves careful manipulation of the gas-take-off valve since the first portion of gas issuing from the vessel is under a substantially greater pressure than subsequent portions withdrawn from storage.

In accordance with the present invention, a method is provided for storing gases in such manner that an amount of gas larger than the atmospheric equivalent of the reservoir volume may be contained therein at an introduction pressure not exceeding that of the atmosphere. The method of this invention eliminates the need of a high pressure storage vessel and further permits convenient release of the stored gas at the desired time and at a desired rate.

The process of this invention makes use of the adsorptive capacity of dry inorganic oxide gel and involves the introduction of such gel, preferably in particle form, into a reservoir provided with means for connection to a source of water and a suitable gas-take-off valve. For charging the reservoir with gas to be stored, the reservoir containing gel particles is extensively evacuated and gas is thereafter charged until further addition will raise the reservoir equilibrium pressure above atmospheric. The reservoir is then closed off. When it is desired to release the stored gas, a controlled amount of water is permitted to enter the reservoir covering a portion or all of the gel particles contained therein, depending upon the desired rate of release of the stored gas. Upon contact of water with the dry gel particles containing sorbed gas, water enters the gel structure by virtue of capillary action, expelling the stored, sorbed gas. The gas thus removed from the pores of the gel adsorbent builds up a pressure in the reservoir and may be released therefrom as desired through the gas-take-off valve.

The dry inorganic oxide gel employed in the instant method will generally be a siliceous gel although other inorganic oxide gels may likewise be used. Typical of the gels contemplated for use in the present process are those of silica, silica-alumina, silica-stannic oxide, silica-alumina-stannic oxide, silica-ceria, silica-thoria, alumina, alumina-chromia, silica-manganese oxide, and the like. The chemical composition of the inorganic oxide gel employed appears to be of minor importance as compared with its porosity, affecting its ability to sorb the gas brought in contact therewith. Since the particular composition of the gel will largely be determined by economic factors, gels comprising a major proportion of comparatively inexpensive silica will ordinarily be used in the storage method of this invention.

The gel is suitably employed in the form of particles, preferably spheroidal in shape, since such particles have the advantages of packing in a uniform manner in the reservoir, thereby affording a maximum exposure of porous gel surface per unit volume of space occupied. The dry gel particles utilized herein may, however, assume other shapes or the adsorbent medium may be made up of a mass of irregularly shaped gel fragments. The particles employed may be made up of gel that has been dried in air at room temperature or slightly elevated temperatures, in which case contact with water causes the gel to disrupt with violence, yielding a mass of shattered fragments. The gel particles employed in the present method may also be those which have been tempered at a temperature of about 1000° F. or higher. In this case, the gel particles ordinarily do not break upon contact with water. The use of tempered gel particles is deemed to be particularly applicable where a slow evolution of gas is desired. Fracture of the dry untempered gel particles, on the other hand, facilitates the release of the sorbed gas.

Evacuation of the reservoir containing dry inorganic oxide gel is generally carried out to a low pressure of less than about 1 millimeter of mercury in order that the gas subsequently introduced into the reservoir is not contaminated with an appreciable amount of air. Preferably, evacuation is effected at a slightly elevated temperature not exceeding about 600° F. when untempered gel particles are used and not exceeding the temperature of tempering when tempered gel particles are employed. After evacuation to the desired degree has been attained, the gas to be stored is introduced into the reservoir until the pressure developed therein is approximately equal to that of the atmosphere. The introduction of gas is thereafter stopped and the reservoir is closed off.

Release of gas from the reservoir is accomplished by allowing a steam of water to contact the dry gel particles containing sorbed gas. The rate of flow of water entering the reservoir is correlated with the desired rate of release of stored gas. The greater the quantity of water contacting the gel particles, the greater is the amount of gas which will be expelled from the gel pores. Also, the higher the rate of flow of the incoming water, the greater is the degree of fracture of the dry untempered gel particles, aiding in the release of the sorbed gas. Thus, the rate of gas release from the storage reservoir is readily regulated by merely controlling the amount and rate of flow of water introduced into said reservoir.

With water as the releasing medium, the method described herein is applicable for storage of water-insoluble gases. Shattering of dry untempered gel particles upon wetting facilitates the release of sorbed gas. While the present invention is, of course, not limited by any theory, it is believed that the disruption of dry untempered gel particles upon wetting is due to the compression of gas present in the gel pores by the rapid infiltration of water to increase the internal pressure to such a point that the gel particles fly apart in a violent manner.

The method described herein is of particular value in applications where light weight, dispensible gas storage can be used to advantage. Gases best adapted to storage utilizing the present method are those characterized by substantial water insolubility and having boiling points below room temperature (about 20° C.) down to about −50° C. Representative gases suitably stored by the method of this invention include light weight normally gaseous hydrocarbons and gaseous substituted derivatives thereof. Thus, propylene, butylene, isobutylene, propyne, propane, butane, isobutane, methyl bromide, ethyl chloride, propyl fluoride, refrigerant gases, commonly referred to as "Freons" and the like, may be conveniently stored by the present method. Due to the nature of the adsorption isotherms, it is possible to store most effectively gases having boiling points near to the temperature condition of the reservoir. For example, if the reservoir is maintained at a temperature of about 20° C. (room temperature), more butylene having a boiling point of −5° C. can be stored at atmospheric pressure than propylene which has a boiling point of −50° C.

A convenient portable system for storing and subsequently discharging gases utilizing the method of this invention is the use of a reservoir vessel comparable to the Kipp generator such as is commonly employed in the production of hydrogen sulfide gas by the action of acid on metal sulfide. Such a generator is made up of three globes. With the method of this invention, inorganic oxide gel particles are placed in the central globe. After evacuation and introduction of the gas to be stored, the vessel is sealed. When discharge of the stored gas is desired, water is poured in the top funnel globe until the bottom globe is full and contact with the gel particles is made. With the gas-take-off valve closed, evolution of gas continues until the water is forced by pressure partly into the top globe. The gel is thereby brought out of contact with the water and further release of sorbed gas ceases. Upon discharge of a portion of the gas so released through the gas-take-off valve, pressure in the central globe drops, permitting water to rise therein and again contact the adsorbent particles, serving to expel additional stored gas from the gel pores. This action may be continued, as variable quantities of the gas are desired, until all the gas contained in the storage vessel has been released.

The following example will serve to illustrate the invention without limiting the same:

*Example*

A silica-alumina hydrosol was prepared by mixing 1.00 volume of a solution of sodium silicate containing 157.0 grams of $SiO_2$ per liter with 1.00 volume of a solution containing 39.79 grams of aluminum sulfate and 30.51 grams of sulfuric acid per liter. The resulting colloidal solution was ejected from a nozzle in the form of globules into a column of gas oil whose depth was eight feet. The globules of solution fell through the oil and gelled before passing into a layer of water located beneath the oil. The time of gelation for the concentrations and proportions of reactants given above was about 4 seconds. The spherical particles of gel were conducted out of the bottom of the column into a stream of water and on removal from the water, base exchanged with an aqueous solution of aluminum sulfate and water-washed. The pellets were then slowly and uniformly dried in super-heated steam at about 300° F. until shrinkage was substantially complete. The silica-alumina gel retained its spheroidal shape during the washing and drying operations.

A quantity of the dry spheroidal gel particles was placed in a reservoir provided with a gas-take-off valve and connection to a source of water. The reservoir was evacuated to a pressure of about 0.1 millimeter of mercury. Thereafter propylene was admitted to the evacuated reservoir and adsorbed on the dry gel particles until the pressure in the reservoir was substantially equal to that of the atmosphere. The reservoir was then closed off.

Upon allowing water to enter the reservoir and contact the gel particles, the pressure in the reservoir rose a number of times to atmospheric, establishing that gas storage beyond the amount required to fill the pore volume was accomplished. The propylene so released from the gel pores could thereafter be discharged from storage through the gas-take-off valve as desired.

While it is contemplated that the method of this invention will find its greatest use where the initial gas pressure in the reservoir of dry inorganic oxide gel is substantially equal to the atmosphere, it will be understood that the procedure described herein may also be employed where gas under a pressure appreciably higher than atmospheric is initially introduced into the storage vessel containing inorganic oxide gel. It will thus be seen that the above description is merely illustrative of preferred embodiments of the invention, of which many variations may be made within the scope of the following claims by those skilled in the art without departing from the spirit thereof.

I claim:

1. In a method for storing gases comprising adsorption of a gas into the pores of a porous adsorbent, the improvement in storage and dispensing of a gas which comprises introducing a substantially water-insoluble gas, in the absence of air, into contact with dry inorganic oxide gel contained in a vessel of confined volume without effecting separation from said gas of any component thereof, terminating the introduction of said gas after a predetermined amount thereof has been adsorbed by said inorganic oxide gel and bringing a controlled stream of water into contact with said inorganic oxide gel at a rate of flow such as to effect release of adsorbed gas therefrom.

2. In a method for storing gases comprising adsorption of a gas into the pores of a porous adsorbent, the improvement in storage and dispensing of a gas which comprises introducing a single component, substantially water-insoluble gas, without change in composition thereof and in the absence of air, into a reservoir of dry inorganic oxide gel contained in a vessel of confined volume until the pressure therein is substantially equal to that of the atmosphere, terminating the introduction of said gas and bringing a controlled stream of water into contact with said inorganic oxide gel at a rate of flow such as to effect the release of adsorbed gas therefrom.

3. In a method for storing gases comprising adsorption of a gas into the pores of a porous adsorbent, the improvement in storage and dispensing of a gas which comprises introducing a substantially water-insoluble gas, in the absence of air, into contact with dry, untempered inorganic oxide gel particles contained in a vessel of confined volume without effecting separation from said gas of any component thereof, terminating the introduction of said gas when the pressure in said vessel is substantially equal to that of the atmosphere and bringing a controlled stream of water into contact with said gel particles, whereby fracture of said gel takes place with simultaneous release of adsorbed gas therefrom.

4. In a method for storing gases comprising adsorption of a gas into the pores of a porous adsorbent, the improvement in storage and dispensing of a gas which comprises introducing a substantially water-insoluble gas having a boiling point below about 20° C. but above −50° C., in the absence of air, into contact with dry inorganic oxide gel contained in a vessel of confined volume without effecting separation from said gas of any component thereof, terminating the introduction of said gas after a predetermined amount thereof has been adsorbed by said inorganic oxide gel and bringing a controlled stream of water into contact with said inorganic oxide gel at a rate of flow such as to effect release of adsorbed gas therefrom.

5. In a method for storing gases comprising adsorption of a gas into the pores of a porous adsorbent, the improvement in storage and dispensing of a gas which comprises introducing a substantially water-insoluble gas, in the absence of air, into contact with dry, spheroidal inorganic oxide gel particles contained in a vessel of confined volume without effecting separation from said gas of any component thereof, terminating the introduction of said gas when the pressure in said vessel is substantially equal to that of the atmosphere and bringing a controlled stream of water into contact with said dry gel particles at a rate of flow such as to effect release of adsorbed gas therefrom.

References Cited in the file of this patent

UNITED STATES PATENTS

| Number | Name | Date |
|--------|------|------|
| 1,429,856 | Etter | Sept. 19, 1922 |
| 1,808,900 | Luening | June 8, 1931 |
| 2,384,311 | Kearby | Sept. 4, 1945 |
| 2,422,251 | O'Brian et al. | June 17, 1947 |
| 2,449,402 | Lipkin | Sept. 14, 1948 |